United States Patent [19]

Currie et al.

[11] 4,033,022

[45] July 5, 1977

[54] HAND OPERATED SWAGER

[75] Inventors: William E. Currie, Cleveland Heights; David W. Gunning, Novelty; John G. Russell, Highland Heights, all of Ohio

[73] Assignee: Parker-Hannifin Corporation, Cleveland, Ohio

[22] Filed: Nov. 24, 1975

[21] Appl. No.: 634,865

[52] U.S. Cl. .................................................. 29/237

[51] Int. Cl.² .......................................... B23P 19/02

[58] Field of Search ............ 29/251, 256, 258, 282, 29/283, 237

[56] References Cited

UNITED STATES PATENTS

| | | | |
|---|---|---|---|
| 26,570 | 12/1859 | Daniels | 269/217 |
| 89,035 | 4/1869 | Gage | 100/289 |
| 111,923 | 2/1871 | Findlay | 74/459 X |
| 359,251 | 3/1887 | Frawley | 144/304 |
| 1,094,978 | 4/1914 | Church | 29/237 |
| 1,190,696 | 7/1916 | Wilzin | 72/473 |
| 2,294,640 | 9/1942 | Wallace | 29/237 X |
| 2,704,104 | 3/1955 | Mueller | 29/237 |
| 3,706,123 | 12/1972 | Whitledge | 29/237 |
| 3,762,209 | 10/1973 | Herndon | 29/237 |
| 3,785,050 | 1/1974 | Whitledge et al. | 29/237 |

*Primary Examiner*—Al Lawrence Smith
*Assistant Examiner*—J. C. Peters
*Attorney, Agent, or Firm*—John N. Wolfram

[57] ABSTRACT

A hand operated swager for attaching a fitting to a hose includes a housing having a turning means rotatably mounted at the top portion thereof and a die for radially contracting the fitting onto the hose is removably mounted at the lower portion of the housing. The turning means is fixed against axial movement on the housing, is manually rotatable by the use of a wrench, and includes a ball nut threadably engaged with a pusher assembly that is axially but not rotatably movable relative to the housing whereby rotation of the turning means causes the pusher assembly to move axially into engagement with the fitting but imparts no rotary force to the pusher assembly that might be transmitted to the fitting. The swager also includes spring retainers for removably retaining the die in the housing.

8 Claims, 3 Drawing Figures

HAND OPERATED SWAGER

BACKGROUND OF THE INVENTION

A hand operated swaging tool for radially contracting or swaging a fitting onto a hose is disclosed in U.S. Pat. No. 3,858,298. It comprises a housing to whose upper portion a ball nut is fixedly attached and on whose lower portion there is mounted a die that contracts the fitting onto the hose when the fitting is moved axially into the die. A pusher means is threadedly engaged with the ball nut and is manually rotatable whereby upon rotation in one direction the pusher means moves axially to engage the fitting and drive it into the die and upon rotation in the other direction the pusher means moves axially away from the fitting whereby the swaged fitting and hose may be removed and an unswaged fitting and a new hose may be inserted.

The pusher means includes a screw rigidly attached to a holder, and an adapter rotatably attached to the holder and engageable with the fitting. Because the holder rotates with the screw, a thrust bearing is interposed between the holder and adaptor in an attempt to avoid applying turning force to the adaptor which in turn would apply turning force to the fitting. However, the thrust bearing does not prevent the rotatable holder from applying some turning force to the adaptor and hence the adaptor applies some turning force to the fitting.

A swinging cam is provided for retaining the die within the housing.

SUMMARY OF THE INVENTION

The present invention is an improvement over the swaging tool disclosed in the above mentioned patent in that the parts are so arranged that no turning force is applied to the adaptor and therefore no turning force is transmitted to the fitting to be swaged. This is accomplished by fixing the pusher means against rotation relative to the housing. The pusher means includes a stem that is threadably engaged with a ball nut assembly that is rotatably mounted on the housing but fixed against axial movement. The ball nut assembly is rigidly connected to a bolt having wrench engaging means whereby the bolt and ball nut assembly may be rotated manually, the bolt and ball nut assembly comprising a turning means.

Spring clips or wire retainers retain the die in the housing.

DETAIL DESCRIPTION

Figure 1:
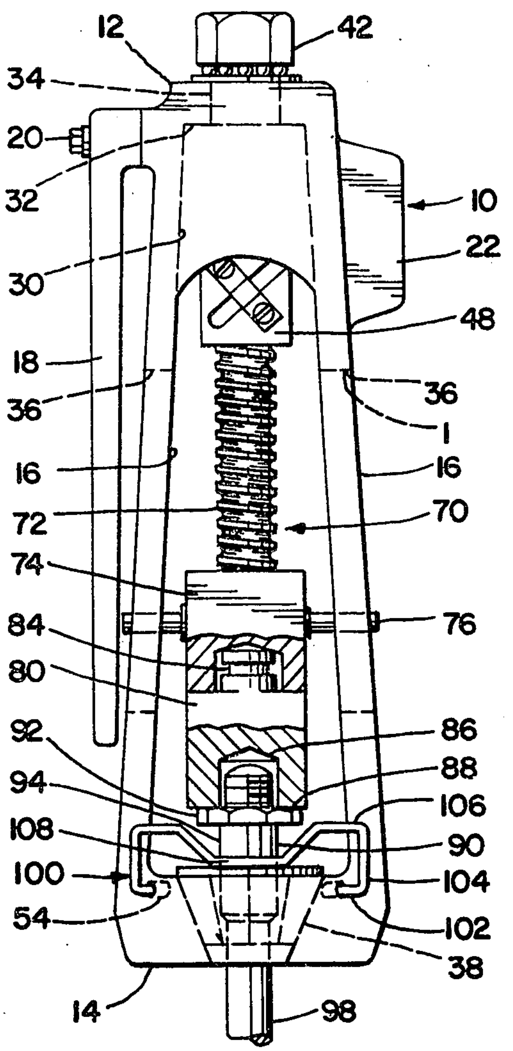
FIG. 1 is a front view of the hand operated swager, partly in cross section and retaining a fitting and hose.
Figure 2:
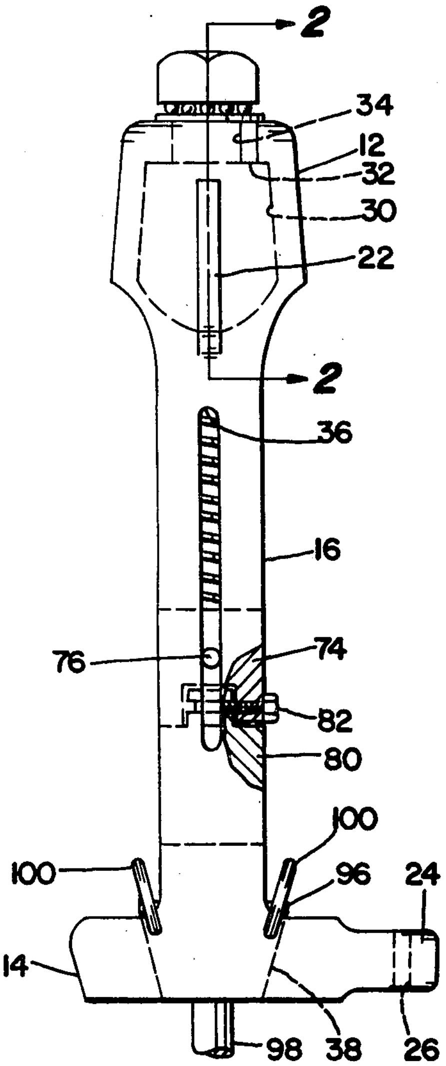
FIG. 2 is a side view of the hand operated swager, partly in cross section.

The hand operated swager of FIG. 1 includes a housing 10 with an end portion 12 and another end portion 14. Joining the ends together are a pair of legs 16. A handle 18 is pivotably connected to the housing by a screw 20 for manually holding the swager in various positions. If the swager is to be secured to a work bench or vise a protrusion 22 on the housing enables the fastening of the swager to the vise while a second protrusion 24 with a bore 26 therethrough provides for attaching the swager to the work bench with a bolt or the like. On the interior of the housing 10 is a cavity 30 leading to a transverse face 32 which surrounds on opening 34 on the one end.

Figure 3:
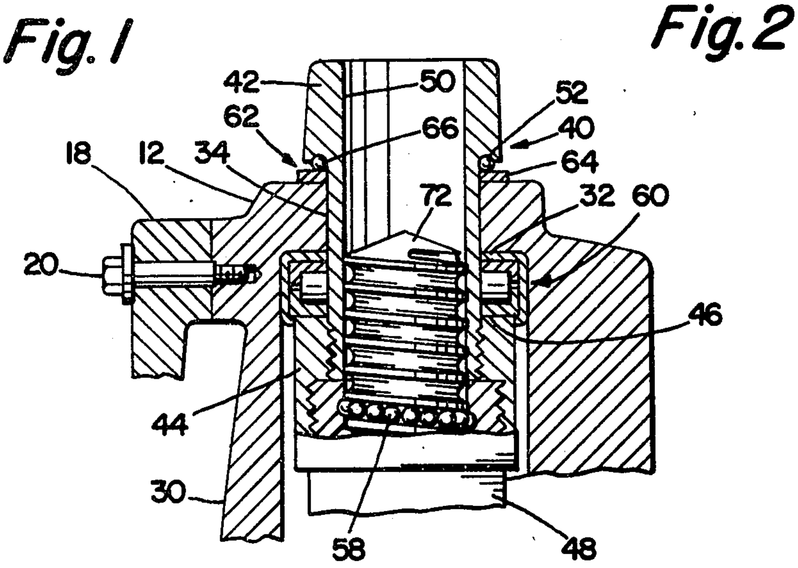
FIG. 3 is an enlarged cross section view of the one end of the hand operated swager taken along lines 2—2 of FIG. 2.

Carried on the one end of the housing is a turning means 40 shown in FIG. 3 which extends through the opening 34 into the cavity 30. The turning means comprises a bolt 42 with a coaxial bore 50 therethrough, a spacer element 44 and a conventional ball nut assembly 48. The bolt is threadably engaged to the spacer element 44 which is threadably engaged to the ball nut assembly 48 so that the turning means can be easily assembled and disassembled.

The turning means is rotated by the application and rotation of a wrench or similar tool to the bolt on the outside of the housing. To prevent axial movement of the turning means bearing means shown in FIG. 3 as 60 and 62 are positioned between the turning means and the housing. Bearing means 60 comprises a standard thrust bearing commonly referred to as a Timken T-126 Thrust Bearing. Disposed between the transverse face 32 and a transverse shoulder 46 on spacer element 44, bearing means 60 abuts the spacer element 44 to prevent upward movement while providing rolling contact between the housing and turning means. Bearing means 62 comprises a washer 64 adjacent the one end of the housing and surrounding opening 34 and a multiplicity of balls 66 confined within an annular recess 52. When the bolt is rotated the balls 66 roll on the washer 64 in an annular path defined by recess 52 to provide rolling contact between the housing and turning means and also to prevent downward movement of the bolt relative to the washer or housing. Because a substantial portion of the forces in attaching a fitting to a hose in the hand operated swager of FIG. 3 are confined to the interior of the housing, bearing means 60 may be a heavier duty bearing than bearing means 62.

To convert the rotation of the turning means into axial movement, a pusher means 70, having a threaded stem 72, threadably engages the ball nut assembly 48 of the turning means. As the turning means rotates the balls 58 in the ball nut assembly 48 rotate in the helical path of the threads of threaded stem 72 and are confined therebetween to move the stem and pusher means. In addition to the threaded stem 72 the pusher means 70 includes a holder 74 press fitted to the threaded stem 72 and carrying projection 76 extending into the slots 36 on the legs 16 of the housing. This projection interlocks the holder and stem with the housing to prevent the rotation thereof while allowing for axial movement as the projection 76 moves from one end of the slot 36 to the other. The projection is positioned in the holder by retaining rings abutting the holder and inserted in grooves on the projection.

An adaptor 80 may be connected to the holder 74 to abut a fitting flange 92 on fitting 90, or holder 74 can be modified to abut the fitting flange 92. When the adaptor 80 is used a set screw 82 on the holder 74 engages an annular groove 84 on the adaptor to lock the adaptor to the holder. The adaptor is provided with a cavity 86 and a face 88 to abut the fitting and impart axial movement thereto. It is possible to omit the adaptor because the projection 76 limits the movement of the holder to only axial movement. Therefore the holder can abut the fitting without imparting rotation to the fitting.

A pair of flexible wire retainers 100 are removably attached to the housing for holding a swaging die 96 in a tapered opening 38. The wire retainers include end sections 102 inserted in openings 54, radial sections 104 extending at substantially right angles away from the end sections and a cross section 106 connecting the radial sections. A bent or deflected portion 108 on cross section 106 yieldably contacts the swaging die to retain the swaging die in the tapered opening. When the bent portion 108 is flexed out of contact with the swaging die and the retainer pivoted away from the legs of the housing the swaging die is free to be removed from the tapered opening 38.

In operation a swaging die 96 is positioned within tapered opening 38 and wire retainers 100 are pivoted toward the legs 16 to yieldably contact deflected portion 108 with the top of the swaging die. A fitting 90 is positioned with its shank 94 resting within the swaging die and a hose 90 is completely inserted within the fitting shank as shown in FIG. 1.

Next, a wrench is placed over the bolt 42 and rotated to impart rotation to the turning means 40. The bolt 42 rolls over balls 66 and spacer element 44 rolls with one of the races on bearing means 60. The rotation of the turning means imparts axial movement to the threaded stem 72 by means of the engagement with the balls 58 of the ball nut assembly 48. The stem does not rotate because the holder 74 is press fitted to the threaded stem and carries the projection 76. As the threaded stem 72, holder 74 and adaptor 80 move axially toward the fitting the projection 76 moves within the slots 16 and engages the surfaces of the slots to prevent rotation of the pusher means 70.

After the adaptor or holder, if no adaptor is provided, abuts the flange 92 of fitting 90, further rotation of turning means 40 advances the fitting into a tapered bore on the swaging die. As the fitting advances through the swaging die the shank 94 of the fitting is radially contracted around the hose 98 to fasten the fitting thereto. When the shank of the fitting is completely contracted around the hose, the torque applied to the wrench by the operator is reversed to rotate the turning means in the opposite direction thereby separating the pusher means from the fitting and hose.

Pivoting the retainers away from the legs of the housing and disengaging the deflected portion from the swaging die releases the swaging die. The hose and attached fitting are now free to be removed through the housing tapered opening.

In an alternative embodiment bearing means 62 may also comprise a thrust bearing, having an upper race abutting the underside of the head of bolt 42 and a lower race resting on the outside surface of the one end portion 12 with a multiplicity of rollers between the races to provide rolling contact between the turning means and housing. Even though both bearing means, 60 and 62, comprise thrust bearings, the means 60 can still be a heavier duty thrust bearing than means 62.

Various modifications and/or revisions of the present invention are feasible by one of ordinary skill in the art and it is intended that the same are included within the scope of the invention as defined by the appended claims.

We claim:

1. Apparatus for swaging a fitting onto a hose comprising;
  a housing,
  turning means rotatably mounted at one end of the housing and fixed against axial movement relative to the housing,
  means on the other end of the housing for receiving a swaging die,
  pusher means threadably engaged with said turning means, and
  means interlocking said pusher means with said housing for preventing rotation of the pusher means relative to the housing whereby rotation of the turning means imparts axial motion to the pusher means without imparting rotation thereto, said turning means comprising a bolt extending through an opening near the one end of the housing, and a ball nut assembly connected to the bolt and threadably engaging the pusher means whereby rotation of the bolt rotates the ball nut assembly to impart axial movement to the pusher means.

2. The apparatus of claim 1 in which said bolt and ball nut assembly have aligned openings therethrough and said pusher means is movable within said openings upon rotation of the bolt.

3. The apparatus of claim 1 in which said turning means includes a spacer fixed to the bolt and ball nut assembly to provide a connection therebetween, and said spacer opposes the housing to prevent axial movement of the bolt, spacer and ball nut assembly relative to the housing.

4. The apparatus of claim 3 in which said bolt has a head at its outer end that provides a transverse face that overlies the housing around said opening and having a shank that extends through said opening, said shank at its inner end having a threaded connection to one end of the spacer, the other end of the spacer having a threaded connection to the ball nut.

5. The apparatus of claim 4 in which the portions of the bolt and the ball nut where threaded onto the spacer are bottomed to prevent further threading onto the spacer.

6. The apparatus of claim 5 in which the bottoming of the bolt and ball nut is against each other.

7. Apparatus for swaging a fitting onto a hose comprising;
  a housing,
  turning means rotatably mounted at one end of the housing and fixed against axial movement relative to the housing,
  means on the other end of the housing for receiving a swaging die,
  said swaging die having an upper transverse surface facing the turning means,
  pusher means threadably engaged with said turning means,
  means interlocking said pusher means with said housing for preventing rotation of the pusher means relative to the housing, and
  a flexible wire retainer means pivotably anchored on the other end of the housing between said other end and said transverse surface and swingable about said pivotal anchor in a direction radially of the swaging die into and out of engagement with said transverse surface for releasably holding the swaging die within the receiving means.

8. Apparatus for swaging a fitting onto a hose comprising;
  a housing,
  turning means rotatably mounted at one end of the housing and fixed against axial movement relative to the housing,
  means on the other end of the housing for receiving a swaging die, pusher means threadably engaged with said turning means, means interlocking said pusher means with said housing for preventing rotation of the pusher means relative to the housing and a pair of flexible wire retainers pivotably anchored on the other end of the housing for yieldably holding the swaging die within the receiving means, each of said flexible wire retainers comprises end sections removably inserted into openings at the other end of the housing, radial sections connected to the end sections and a cross section connecting the radial sections, said cross section having a deflected portion yieldably contacting the swaging die in one position and being pivotable to a second position to release the swaging die.

* * * * *